United States Patent [19]
Ferdani

[11] Patent Number: 5,416,154
[45] Date of Patent: May 16, 1995

[54] BEARING MATERIAL

[75] Inventor: Philip Ferdani, Rugby, England

[73] Assignee: T&N Technology Limited, Rugby, England

[21] Appl. No.: 244,759

[22] PCT Filed: Dec. 17, 1992

[86] PCT No.: PCT/GB92/02339
§ 371 Date: Jun. 8, 1994
§ 102(e) Date: Jun. 8, 1994

[87] PCT Pub. No.: WO93/13174
PCT Pub. Date: Jul. 8, 1993

[30] Foreign Application Priority Data

Dec. 24, 1991 [GB] United Kingdom ............... 9127342

[51] Int. Cl.$^6$ ............... C10M 147/02; C10M 147/04; C10M 155/02
[52] U.S. Cl. .................... 524/494; 252/12.4; 384/908; 384/911; 524/495; 524/514; 524/789; 524/879
[58] Field of Search ............... 252/12.4; 384/908, 911; 524/514, 494, 495, 789, 879

[56] References Cited

U.S. PATENT DOCUMENTS

| Re. 29,092 | 12/1976 | Schiefer et al. | 252/12.4 |
| 3,779,918 | 12/1973 | Ikeda et al. | 252/12.4 |
| 4,371,445 | 2/1983 | Faigle | 252/12 |
| 4,575,430 | 3/1986 | Périard et al. | 252/12.6 |
| 4,626,365 | 12/1986 | Mori | 252/12 |
| 4,787,991 | 11/1988 | Morozumi et al. | 252/12.4 |
| 4,824,898 | 4/1989 | Sukigara et al. | 524/494 |
| 5,091,098 | 2/1992 | Tanaka et al. | 252/12.2 |
| 5,124,397 | 6/1992 | Kanazawa et al. | 524/496 |

FOREIGN PATENT DOCUMENTS 1311847 3/1973 United Kingdom.
1486441 9/1977 United Kingdom.

Primary Examiner—Morton Foelak
Attorney, Agent, or Firm—Synnestvedt & Lechner

[57] ABSTRACT

A plain bearing material, e.g. for a bearing bush or a thrust washer has a composition of 45 to 60 weight percent of semiaromatic polyamide, 15 to 20 weight percent of glass fibre, 10 to 20 weight percent of graphite, 10 to 20 weight percent of polytetrafluoroethylene and up to 5 weight percent of silicon oil.

6 Claims, No Drawings

BEARING MATERIAL

This application is a 35 USC 371 of PCT/G.B.92/02339 filed Dec. 17, 1992.

This invention is concerned with a plain bearing material suitable for use e.g. as a bearing bush or as a thrust washer.

It is possible to use unfilled nylon 6.6 as a plain bearing material, e.g. for bearing bushes, but this material is not suitable for applications requiring operation at high pressures and/or temperatures since the wear of the material is unacceptable. The wear resistance of the material can be improved by mixing strengtheners and/or lubricants with the nylon. For example, one bush that is on the market contains approximately 30% by weight of glass fibres and approximately 15% by weight of polytetrafluoroethylene. Such bushes have an extended range of operation when compared to unfilled bushes but this range is still considerably more limited than is desirable.

It is an object of the present invention to provide a plain bearing material which has an extended range of operation in comparison with existing materials.

The invention provides a plain bearing material having a composition comprising:
45 to 60 weight per cent of semi-aromatic polyamide,
15 to 25 weight per cent of glass fibre, 10 to 20 weight per cent of graphite, 10 to 20 weight per cent of polytetrafluoroethylene and up to 5 weight per cent of silicon oil.

The semi-aromatic polyamide may be "Ultramid T" (Registered Trade Mark) obtainable from BASF. "Ultramid T" is a trade name for nylon 6/6 T resins that contain both aromatic and aliphatic building blocks and are intended for injection moulding or extrusion. It is produced by polycondensation of caprolactam, hexamethylene diamine, and terephthalic acid. By the term "silicon oil" is intended a polymethylsiloxane which has a high viscosity.

A plain bearing material in accordance with the invention is found to exhibit significantly better wear characteristics than existing materials and, accordingly, can be utilised over a greater range of pressures and temperatures. The results obtained are considerably superior to those which might have been expected from the addition of graphite to the composition. Indeed as Table 2 of the attached Tables shows, unfilled Ultramid T performed less well than unfilled Nylon 6.6, but, contrary to expectations, a material according to the invention was superior to a material containing nylon 6.6 instead of Ultramid T.

Preferably, in a bearing material in accordance with the invention, the composition comprises 1 to 3 weight per cent of the silicon oil. The graphite and the polytetrafluoroethylene may be present in approximately equal quantities, e.g. 15% of graphite and 13% of polytetrafluoroethylene.

The material of the invention may be made into a bearing bush by injection moulding, or other means. Such a bearing bush may have a flange which may provide a thrust surface. The material may alternatively be made into a thrust washer.

There now follows a detailed description of an example of a material which is illustrative of the invention.

The material of the illustrative example was compounded to form granules. The material had a composition comprising 50% by weight of Ultramid T (Registered Trade Mark) semi-aromatic polyamide, 20 weight per cent of glass fibre, 15 weight per cent of graphite, 13 weight per cent of polytetrafluoroethylene, and 2 weight per cent of silicon oil. The glass fibre was E-glass obtainable from Owens Corning (grade R23D). The graphite was synthetic graphite obtained from Lonza (grade K5 5/75, ie substantially no particles below 5 mm in diameter or above 75 mm in diameter). The polytetrafluoroethylene was "Fluon" (Registered Trade Mark) L 169 obtained from ICI. The silicon oil was obtained from Dow Corning (grade DC 200/30000).

The granules were injection moulded to form cylindrical bearing bushes 20 mm in diameter, 15 mm in length and 1.5 mm in wall thickness. These bushes were then subjected to wear rate tests as were bushes of the same dimensions made from unfilled Nylon 6.6, Nylon 6.6 filled with 20% glass fibre, 15% graphite, 13% polytetrafluoroethylene and 2% silicon oil, i.e the same filling materials in the same percentages as in the example. A commercially available bush having the same dimensions and a composition of Nylon 6.6 filled with 30% fibre and 15% polytetrafluoroethylene was also tested. The results of the tests are summarised in the attached Tables.

Table 1 shows a comparison of wear rates (expressed in micrometres per hundred hours) at various PV (pressure times velocity) values (expressed in Mega Pascal metres per second) the test speed being 750 RPM. It can be seen that, at PV values of 0.1, 0.21 and 0.35, the composition according to the invention consistently out performed the commercially available product with the improved performance increasing at higher PV values.

Table 2 shows a comparison at a PV value of 0.1 of the wear rates of filled and unfilled Ultramid T and Nylon 6.6, the filling being the same in both cases and being 20% glass fibre, 15% graphite, 13% polytetrafluoroethylene and 2% silicon oil. The unfilled Nylon 6.6 out performed the unfilled Ultramid T but, contrary to expectation, the filled Ultramid T out performed the filled Nylon 6.6 very significantly. Table 2 shows that unfilled Nylon 6.6 has a very good wear rate but unfilled Nylon 6.6 cannot be used at higher PV values. Ultramid T filled according to the invention can be used at higher PV values and has a wear rate significantly better than filled Nylon 6.6.

Table 3 shows wear rate results at a PV of 0.21 from a different type of testing machine to that used for Tables 1 and 2. Table 3 confirms that the composition according to the example significantly out performs filled Nylon 6.6.

TABLE 1

| MATERIAL | P.V. | WEAR RATE |
| --- | --- | --- |
| Ultramid T | 0.1 | 25 |
| 20% Glass Fibre | 0.21 | 58 |
| 15% Graphite | 0.35 | 165 |
| 13% PTFE | | |
| 2% Silicon Oil | | |
| Nylon 6.6 | 0.1 | 44 |
| 30% Glass Fibre | 0.21 | 118 |
| 15% PTFE | 0.35 | 559 |

TABLE 2

| MATERIAL | NYLON 6.6 | UTRAMID T |
| --- | --- | --- |
| Unfilled | 20 | 88 |
| Filled | 40 | 25 |

TABLE 3

| MATERIAL | PV | WEAR RATE |
|---|---|---|
| Ultramid T<br>20% Glass Fibre<br>15% Graphite<br>13% PTFE<br>2% Silicon Oil | 0.21 | 77 |
| Nylon 6.6<br>30% Glass Fibre<br>15% PTFE | 0.21 | 170 |
| Nylon 6.6<br>20% Glass Fibre<br>15% Graphite<br>13% PTFE<br>2% Silicon Oil | 0.21 | 153 |

I claim:

1. A plain bearing material having a composition comprising: 45 to 60 weight per cent of semi-aromatic polyamide, 15 to 25 weight per cent of glass fibre, 10 to 20 weight per cent of graphite, 10 to 20 weight percent of polytetrafluoroethylene, and up to 5 weight percent of silicon oil.

2. A bearing material according to claim 1, characterised in that the semi-aromatic polyamide is a copolymer of caprolactam, hexamethylene, diamine and terephthalic acid.

3. A bearing material according to claim 1, characterised in that the composition comprises 1-3 weight percent of silicon oil.

4. A bearing bush made of a material according to either one of claims 1 and 2.

5. A bearing bush according to claim 4, characterised in that the bush has at least one flange thereon to act as a thrust surface.

6. A thrust washer made of a material according to either one of claims 1 and 2.

* * * * *